No. 782,617. PATENTED FEB. 14, 1905.
S. MELLINGER.
HOSE RACK.
APPLICATION FILED AUG. 26, 1904.
2 SHEETS—SHEET 1.
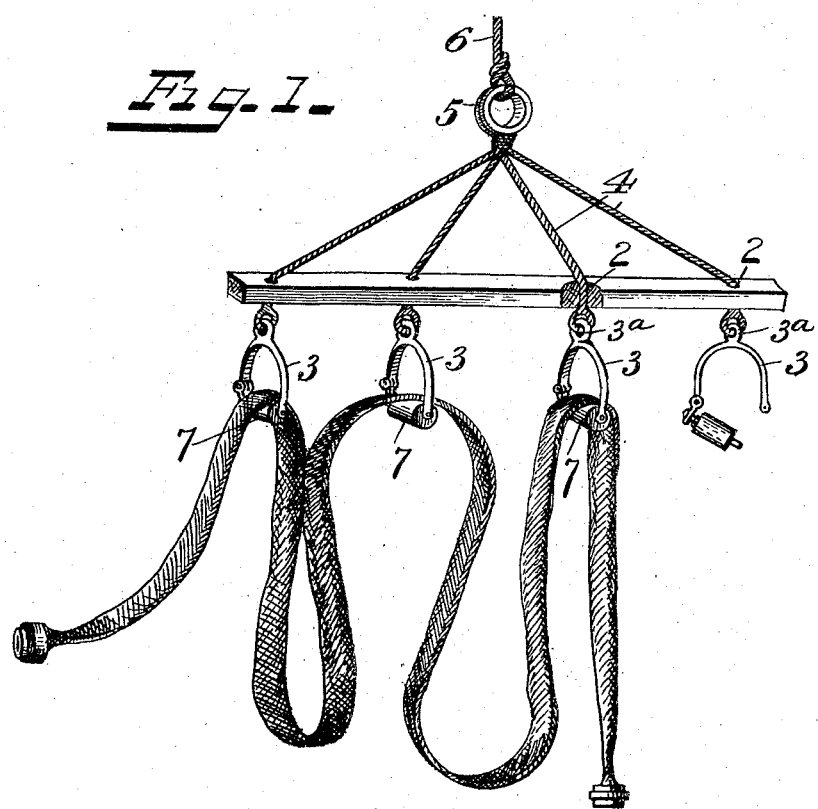
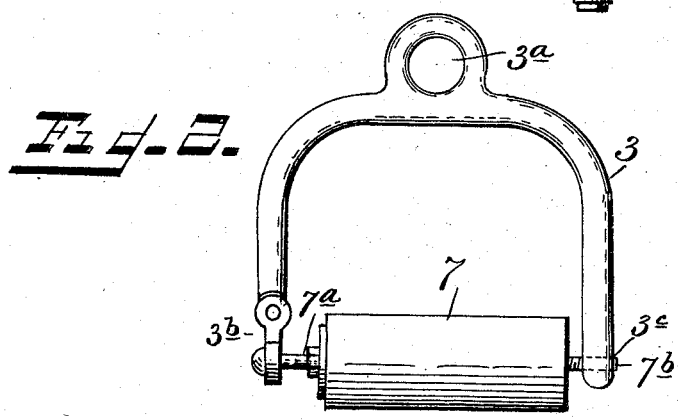
Inventor:
Samuel Mellinger,
Witnesses:

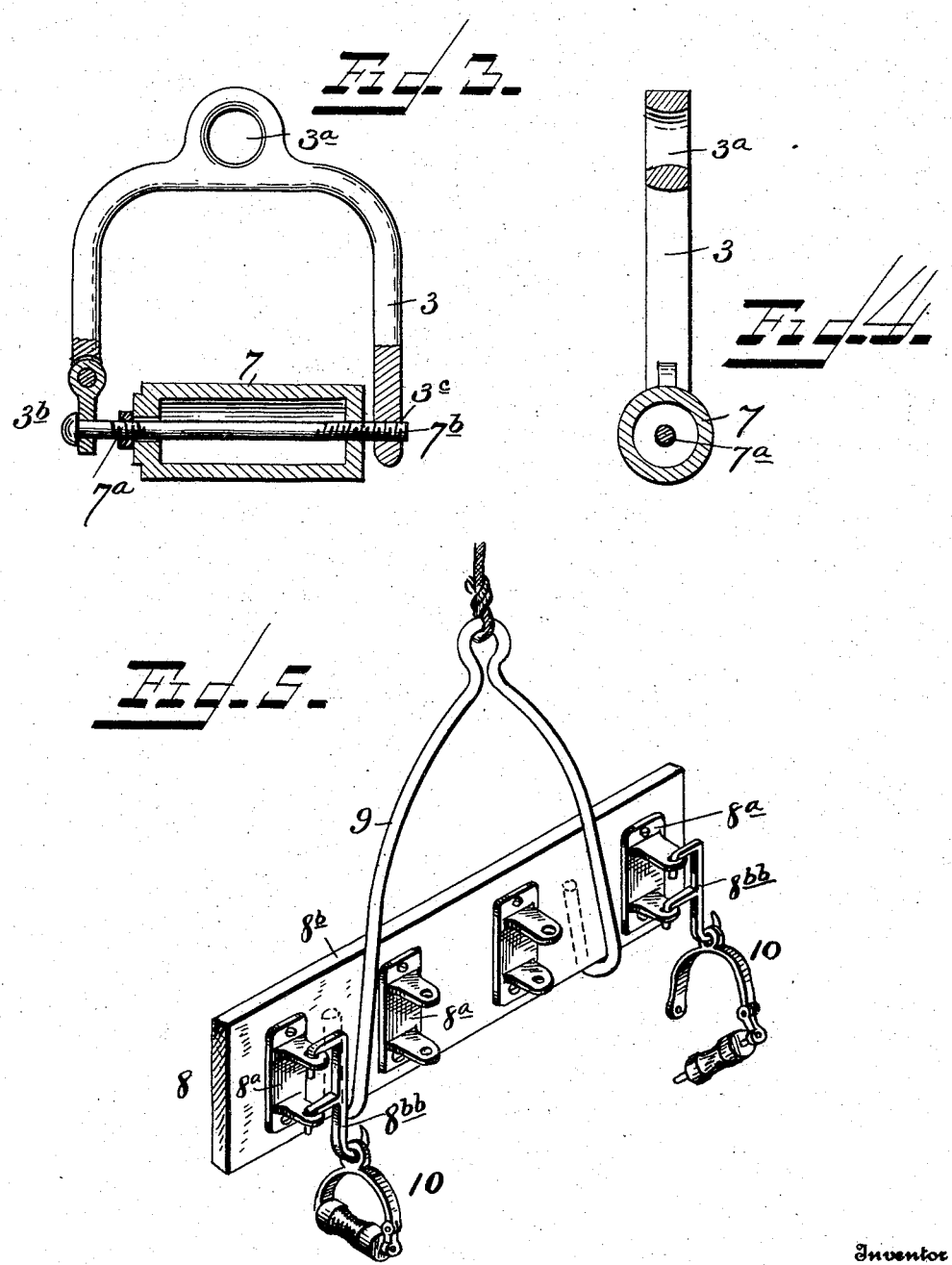

No. 782,617. Patented February 14, 1905.

UNITED STATES PATENT OFFICE.

SAMUEL MELLINGER, OF MOUNT PLEASANT, PENNSYLVANIA.

HOSE-RACK.

SPECIFICATION forming part of Letters Patent No. 782,617, dated February 14, 1905.

Application filed August 26, 1904. Serial No. 222,346.

*To all whom it may concern:*

Be it known that I, SAMUEL MELLINGER, a citizen of the United States, residing at Mount Pleasant, in the county of Westmoreland and State of Pennsylvania, have invented new and useful Improvements in Hose-Racks, of which the following is a specification.

My invention relates to improvements in what may be termed "hose-racks."

It has for its object to provide for the ready and convenient suspending or supporting of hose, such as used for delivering a stream of water for various purposes, up out of the way when not in use and whereby the surplus or adhering water may be drained therefrom and whereby said hose may be quickly and readily released from its elevated position simply by drawing or pulling upon the hose, as when wanted for use.

Said invention consists of certain structural features, substantially as hereinafter more fully disclosed, and particularly pointed out by the claims.

In the accompanying drawings, Figure 1 is a view showing a hose-rack embodying my invention, with a water-hose in suspended position thereon and one of the hose-stirrups in the position it assumes as when the hose has been removed or drops therefrom, the bracket-bar thereof being shown partly broken to disclose the holes therein. Fig. 2 is an enlarged view of a hose stirrup or hanger. Fig. 3 is an axial sectional view of the same in the longitudinal plane. Fig. 4 is a cross-section thereof. Fig. 5 is a like view as Fig. 1 of a modification principally as relates to the brackets or means for suspending the hose-supporting stirrups, with the rolls of the latter also slightly modified and one of these in the position it assumes as when the hose drops therefrom.

In the carrying out of my invention I provide a bracket 1, preferably in the form of a bar, providing it with a plurality of vertical openings or holes 2 at suitable intervals apart for a purpose presently seen. A plurality or number of stirrups or hangers 3, preferably of the general "horseshoe" outline, as shown, are provided centrally of their upper arcuate portions with integral eye formations $3^a$, and through these latter are passed and secured the lower ends or terminals of branch lines or cables 4, passing through the holes or apertures 2 in the bar or bracket 1 and converged to and looped around the concaved surface of a ring 5, to which they are suitably bound in a manner well understood in uniting such parts together. To said ring is designed to be secured or connected a suspending line or rope 6 for the suitable retention of the bracket or bar in elevated position. Each stirrup or hanger has arranged in its lower or entrance opening a roll 7 or its equivalent as relates to function, fixed to an axle or shaft $7^a$, which axle or shaft is held at one end in any suitable way, as against accidental detachment, to an apertured, hinged, or pivoted section $3^b$ of said stirrup. Said axle or shaft has its opposite end portion screw-threaded, as $7^b$, and received within an aperture $3^c$, also having its wall screw-threaded for engagement with said screw-threaded portion of said shaft. This arrangement allows the roll 7 to be swung from across the entrance-opening of the stirrup, as in permitting the withdrawal or dropping of the water-hose out of the latter, as will later more fully appear.

With the bracket-bar 1 suitably suspended in position and the rolls of the several stirrups swung away from across the entrance-openings of the latter a water-hose may be looped or draped successively through said stirrups, as will be readily understood, and as each loop or fold is formed each roll be moved into position so as to cause its screw-threaded axle to aline the coincident screw-threaded aperture in the opposite arm of said stirrup, and then by properly turning said roll said axle may be secured, with said roll and hose, conveniently in place in said stirrups up out of the way when not in use. This arrangement also provides, by the unscrewing action exerted upon the screw-threaded stub-axles of the stirrups as the rolls of the latter are revolved by the drawing or pulling of the hose thereover, for the quick and simultaneous release or dropping of said hose, as will be appreciated, when the same is desired for use. It will also be noted that by the aforesaid disposition of parts the rack is adapted to swing or adjust itself axially or radially to freely or readily conform to any direction of pull which may be exerted upon the hose, as in removing the same for use. Also in arranging or disposing the rack upon the outside a suitable housing may be improvised or specially provided therefor, as will be readily appreciated.

In the modification as disclosed by Fig. 5 it will be noted that in lieu of the form of brackets as above described may be substituted the brackets 8, each comprising a two-armed plate 8ª, secured to a board 8ᵇ, supported in elevated position, as shown, the means therefor including a bail-like support 9, itself similarly suspended as the branch-line-equipped ring 5, the arms of said plate 8ª having pivotally connected thereto crane-like hangers 8ᵇᵇ for stirrups 10 of general construction as the aforesaid stirrups and having their rolls 10ª peripherally concaved or grooved to more conveniently accommodate the looping or draping of the hose thereover.

It will be understood that latitude is allowed as to details herein, as they may be changed as circumstances suggest without departing from the spirit of my invention and the latter still be protected.

I claim—

1. In a device of the character described, the combination of a yoke and a support for the draped or looped hose, arranged in the entrance-opening of said yoke and having screw-threaded connection with said yoke for axial movement therein to permit its displacement or dropping out of normal position as the hose is pulled or drawn thereover.

2. The combination of a yoke, a hose support or rest arranged in its entrance-opening with one end supported in a hinged or pivoted section of said yoke and its other end having screw-threaded connection with said yoke.

3. In a device of the character described, the combination of a bracket, suspending means for said bracket, a yoke having a yielding connection with said bracket and a support for the draped or looped hose, arranged in the entrance-opening of said yoke and having screw-threaded connection with said yoke to permit its displacement or dropping out of normal position as said hose is drawn or pulled thereover.

4. The combination of a bracket comprising a bar having a series of spaced-apart vertical openings, a plurality of yokes and lines passed through said openings and connected to a common suspending means and to said yokes, said yokes having roll-equipped shafts arranged in the entrance-openings of said yokes, one end of each shaft having screw-threaded connection with one arm of each yoke and the other end of such shaft being supported in a pivoted section of said yoke.

In testimony whereof I have signed my name to this specification in the presence of two subscribing witnesses.

SAMUEL MELLINGER.

Witnesses:
 GEORGE WALTER,
 H. R. BRINKER.